Feb. 24, 1948.        W. R. WEEKS        2,436,682

SEAR MECHANISM

Filed Aug. 8, 1946

Inventor:
Walter R. Weeks,
by Claude A. Mott.
His Attorney.

Patented Feb. 24, 1948

2,436,682

UNITED STATES PATENT OFFICE 2,436,682

SEAR MECHANISM

Walter R. Weeks, Hamden, Conn., assignor to General Electric Company, a corporation of New York Application August 8, 1946, Serial No. 689,233

4 Claims. (Cl. 89—132)

My invention relates to sear mechanism, more particularly to sear mechanism for automatic guns, and has for its object simple and reliable means for positively latching and securing the bolt of the gun while, at the same time, providing for the release of the bolt with a minimum force for the firing of the gun.

My invention has particular application to a gun in which the bolt is retained in a gun-unloaded position until the gun is to be fired at which time the sear mechanism is operated to release the bolt.

It will be understood that in automatic guns, especially machine guns of substantial size, the bolt of the gun is thrown back upon the firing of the gun with a tremendous force and the bolt, after striking the recoil or buffer spring, is moved forward with a tremendous force.

In accordance with my invention in one form I provide a latching arm with a latching roller on its end and with an intermediate roller between and engaging the latching roller and a pivot pin for the arm. This construction provides great strength while, at the same time, giving a roller bearing action with minimum friction when the arm is turned to a releasing position so that the arm can be turned by a relatively small force, for example, by means of a small electromagnet.

Figure 1:
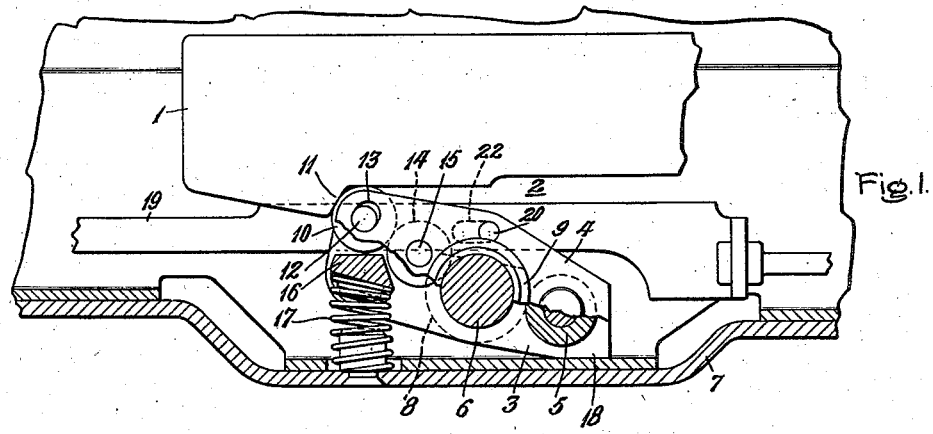
Figure 2:
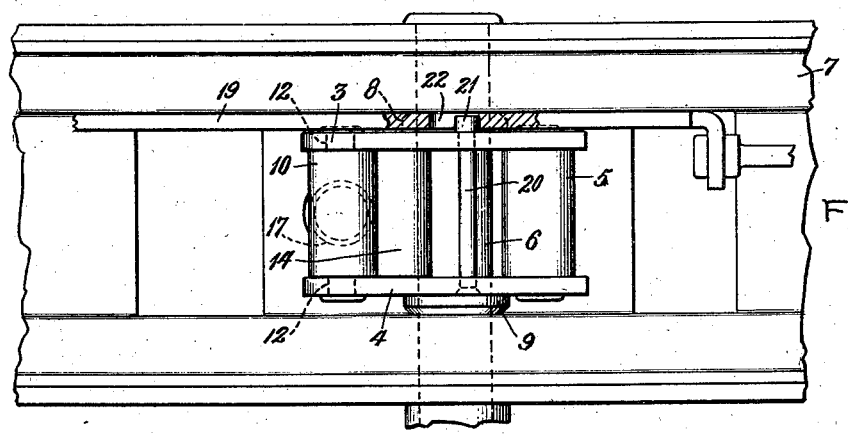
Figure 3:
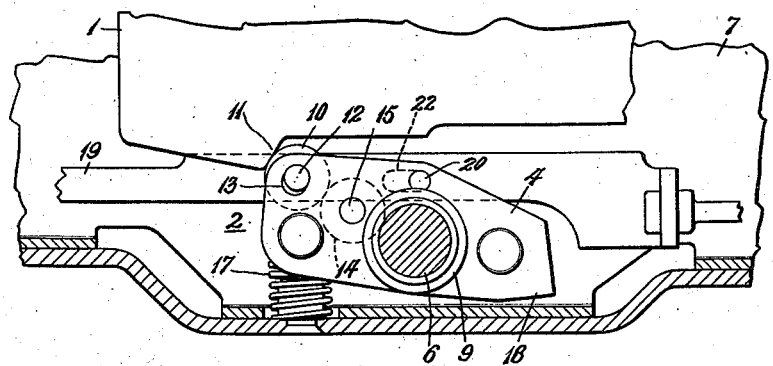
Figure 4:
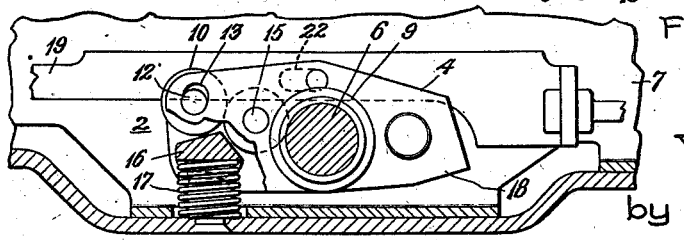

For a more complete understanding of my invention reference should be had to the accompanying drawing, Fig. 1 of which is a fragmentary view partly in section of sear mechanism embodying my invention; Fig. 2 is a fragmentary plan view of Fig. 1; Fig. 3 is a view similar to Fig. 1 but showing the sear mechanism in an intermediate position, while Fig. 4 is a view similar to Fig. 1 but showing the sear mechanism in the bolt-released position.

Referring to the drawing, I have shown my invention in one form as applied to the latching and securing of the gun bolt 1 mounted for rectilinear movement from the left toward the right, and vice versa. When the gun is fired it will be understood that the bolt 1 is thrown by the force of the explosion to the left hand to an extreme position into engagement with a recoil or buffer spring from which it rebounds and moves toward the right hand a short distance and is secured in the gun-unloaded position shown in Fig. 1 by the sear mechanism 2. When the gun is to be fired the sear mechanism is operated to release the bolt, whereupon the bolt is moved by a suitable spring, not shown, in a right-hand direction to the loading position, the gun breech mechanism is locked in place and the gun fired.

In accordance with my invention the sear mechanism 2 comprises a pivoted arm or frame consisting of two parallel plate members 3 and 4 secured rigidly together by a laterally extending pin 5 extending between their right-hand ends. This arm or frame, constituted by the members 3, 4 and 5, is mounted pivotally on a stationary pivot pin 6 constituting a stationary roller having its ends secured in trough-shaped supporting member 7 forming part of the gun, spaced collars 8 and 9 being provided on opposite sides of the frame.

For the purpose of securing the bolt 1, a latching roller 10 is mounted on the left-hand end of the frame between the members 3 and 4 which roller, as shown in Fig. 1, engages a projection 11 on the bolt 1 thereby to secure the bolt in its gun-unloaded position. The roller 10 is provided with a relatively small trunnion 12 at each end, which trunnions constituting journals extend through parallel slots 13 in the members 3 and 4, the slots extending parallel with the plane surface of the projection 11 and substantially at right angles with the arm. Also mounted on the members 3 and 4 is a second roller 14 provided with a trunnion 15 at each end, these trunnions extending through bearing apertures in the members 3 and 4. This roller 14 is positioned directly between the pivot pin 6 and the roller 10 so as to engage the pin and the roller 10.

When the roller 10 is in its holding position shown in Fig. 1 with its trunnions bearing against the lower end walls of the slots 13 its axis of rotation lies in a plane passing through the axis of rotation of the roller 14 and the center of the pin 6. The members 3 and 4 are additionally secured together at their left-hand ends by a cross member 16 which forms a seat for the upper end of a biasing spring 17, the lower end of which bears against the support 7. By means of the spring 17 the frame and roller 10 are biased in a clockwise direction about the pin 6 to the holding position shown in Fig. 1 in which position the right-hand end 18 of the frame engages the supporting member 7.

When the bolt 1 is to be released an operating link 19 is moved toward the left hand, as by an electromagnet, thereby to move the frame and roller 14 counterclockwise about the pivot pin 6, the frame being provided with a cross pin 20 having one end 21 projecting into a slot 22 in the link 19. During the counterclockwise releasing movement of the frame the roller 14 rolls on the stationary pin 6 and is thereby turned in a counterclockwise direction and imparts a clockwise rotation to the roller 10 whereby the roller 10 is caused to roll along the surface of the projection 11, its trunnions 12 move upward in the slots 13. This rolling of the roller 10 on the projection 11 takes place without any sliding between the two parts until the trunnions of the roller 10 reach the upper walls of their slots 13, at which time the parts are in the relative positions shown in Fig. 3. Thereafter, as the frame and roller 10 are turned to their fully bolt-releasing positions shown in Fig. 4 the roller 10 is caused to slide somewhat, as well as roll, on the surface of the projection 11.

The rolling action provides for the minimum friction and consequently minimum required operating force applied to the link 19 during the first part of the releasing movement to the position shown in Fig. 3 and, after the movement of the parts has thus been started and their inertias overcome, the subsequent sliding action between the roller 10 on the projection 11 does not require any appreciable additional force applied to the link 19. Moreover, when the link 19 is operated by an electromagnet, the force applied to the link by the armature of the magnet will be increased as the armature of the magnet approaches its fully attracted position.

It will be observed that this construction provides great strength because the force with which the projection 11 engages the roller 10 as the bolt 1 is thrown toward the right hand from the buffer spring is transmitted from the roller 10 to the roller 14 and from the roller 14 to the relatively large and rigid pin 6. The engaging surface of the projection 11 on the bolt is so disposed angularly that a perpendicular line passing through its point of engagement with the roller 10, as shown in Fig. 1, extends near or through the center line of the pin 6 so that the component of the force of the bolt tending to turn the frame is very small and any tendency to turn the frame in a counterclockwise direction is overcome by the biasing spring 17. This biasing spring 17 is strong enough to assure that it returns the frame and parts carried on it to the latching position of Fig. 1 in time to catch the bolt 1 on its rebound from the buffer spring.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. Sear mechanism comprising an arm, a pivot pin for said arm constituting a roller, a first latching roller on said arm, a second roller on said arm between and engaging said pivot pin and said first roller, means for moving said arm about said pivot pin to a predetermined latching position, and means for turning said arm about said pivot pin to move said first roller to a releasing position whereby said first roller rolls on said second roller and said second roller rolls on said pivot pin.

2. Sear mechanism for securing the bolt of a gun comprising an arm, a stationary pivot pin for said arm constituting a stationary roller, a first latching roller on said arm, a second roller on said arm between and engaging said pivot pin and said first roller, a spring biasing said arm about said pivot pin to a latching position, and means for turning said arm about said pivot pin against the force of said spring to move said first roller to a releasing position whereby said first roller rolls on said second roller and said second roller rolls on said pivot pin.

3. Sear mechanism comprising a frame, a stationary pivot pin for said frame constituting a stationary roller, said frame being provided with oppositely disposed parallel slots in one end substantially at right angles with said frame, a first latching roller on said frame provided with journals extending into said slots, a second roller between and engaging said pivot pin and said first roller, and means for turning said frame about said pivot pin to move said first roller to a releasing position whereby said first roller rolls on said second roller, said second roller rolls on said pivot pin and the journals of said first roller move in said slots.

4. Sear mechanism for securing the bolt of a gun comprising a frame, a stationary pivot pin for said frame constituting a stationary roller, said frame being provided with oppositely disposed parallel slots in one end substantially at right angles with said frame, a latching roller on said frame provided with trunnions extending into said slots, a second roller between and engaging said pivot pin and said first roller, a stop for said arm, a spring biasing said arm about said pivot pin against said stop to a latching position, and means for turning said frame about said pin against the force of said spring to move said first roller to a releasing position whereby said first roller rolls on said second roller, said second roller rolls on said pivot pin and the trunnions of said first roller move in said slots.

WALTER R. WEEKS.